United States Patent [19]
Flanagan

[11] Patent Number: 5,472,803
[45] Date of Patent: Dec. 5, 1995

[54] CHARGE RETENTION BATTERY

[76] Inventor: Hugh L. Flanagan, 22 Randolph St., Canton, Mass. 02021

[21] Appl. No.: 240,222

[22] Filed: May 10, 1994

[51] Int. Cl.$^6$ .................................................. H01M 2/38
[52] U.S. Cl. .............................. 429/70; 429/72; 429/113
[58] Field of Search ................................ 429/70, 113, 72

[56] References Cited

U.S. PATENT DOCUMENTS 4,439,501  3/1984  Flanagan ................................... 429/70

Primary Examiner—John Niebling
Assistant Examiner—Brendan Mee
Attorney, Agent, or Firm—Cesari and McKenna

[57] ABSTRACT

A charge-retention battery includes in a cover a plurality of reservoirs corresponding to the cells of the battery. The cover has the lateral dimensions of a conventional battery case and shortened sides. Minimum length transfer tubes run between the reservoirs and the cells, through the lid of the battery. The tubes fit between adjacent battery plates, with only slight modification of the plates required. To remove electrolyte from the cells and prevent self-discharge, inert gas under pressure is fed to the cells. The gas forces the electrolyte from the cells, through the transfer tubes and into the reservoirs. To place battery in service, the gas is released and electrolyte flows from each of the reservoirs, through the transfer tubes to the associated cells.

10 Claims, 3 Drawing Sheets

CHARGE RETENTION BATTERY

FIELD OF THE INVENTION

The invention relates generally to batteries and, in particular, to batteries that retain their charge during periods of prolonged non-use.

BACKGROUND OF THE INVENTION

There are many uses for large capacity batteries, such as starting automobile or boat engines, and, recently, supplying supplemental power to solar-power or wind-power systems. The storage batteries for these power systems may be used either as backups to the systems or to supply additional power during periods of peak need.

The batteries may sit for extended periods of time without use. For example, a battery which starts an engine on a sailboat is typically brought into service only when wind conditions adversely affect the progress of the sailboat along its desired route. Also, a battery which supplies supplemental power to a solar-power or wind-power system may be called upon sporadically, when weather conditions prevent the system from producing adequate power to meet ordinary demand or when demand exceeds the operating capacity of the system. In order for the batteries to be ready for this service, they must either be periodically charged or they must be able to retain their charge during the periods of non-use.

Batteries in some of these systems are charged whenever the systems are in use. For example, automobiles charge their batteries when the engine is in use. Accordingly, if the automobile is used relatively frequently, the battery retains its charge. Special arrangements must be made to charge batteries in other systems. For example, batteries for backup power systems are charged by diverting power from the system when the demand for power is relatively low. If demand does not reach a sufficiently low level, periodic charging may be impractical. Periodic charging of the batteries on sailboats may also be impractical, since the engines may be rarely used even though the boats are frequently in use. Accordingly, the charging may be forgotten, and thus, the batteries may be incapable of operating when they are most needed.

A prior invention of mine is directed to a battery which retains its charge during extended periods of non-use by separating the battery electrolyte from the battery electrodes, as described in my prior U.S. Pat. No. 4,439,501. This prior battery includes a system for providing to battery cells inert gas under pressure. The gas forces the electrolyte out of the battery cells and into a storage reservoir. The inert gas then remains in the cell to protect the electrodes from deterioration, for example, due to oxidation. To place the battery in service, the inert gas is released from the battery cells and the electrolyte is returned thereto under the force of gravity.

To form the storage reservoir, the prior battery includes an outer casing that essentially surrounds a conventional-size battery. The electrolyte is forced from the bottoms of the cells into this outer casing and, through somewhat circuitous channels, to a reservoir within the casing and above the cells. This prior battery has essentially two problems. First, the transfer rate of the electrolyte from the cells to the reservoir is relatively slow, unless the pressure of the gas is unacceptably high. The transfer rate of the electrolyte from the reservoir to the cells is also relatively slow, since the electrolyte returns under gravity along the circuitous channels. Second, the outer casing requires custom manufacture, which increases the cost of this battery. This casing also increases the over-all size of the battery, and thus, the battery may not fit into battery storage compartments.

SUMMARY OF THE INVENTION

The inventive charge-retention battery includes in each cell a straight, minimum-length transfer tube that readily transfers electrolyte between the cell and an associated reservoir formed in an attached battery cover. The electrolyte is forced from the cells by pressurized inert gas and travels relatively quickly through these transfer tubes to the associated reservoirs, at acceptable gas pressures. The inert gas remains in the cells to protect the battery electrodes from deterioration. To return the battery to service, the inert gas is released from the cells and the electrolyte travels, under the force of gravity, relatively quickly back to the cells through the transfer tubes.

The charge-retention battery has essentially the same dimensions as a standard-size large-capacity battery, with the exception of height. The cover of the charge-retention battery is approximately four inches higher than that of the standard battery, to accommodate the reservoirs. The enlarged cover is relatively easy to manufacture. It is essentially a standard-size battery casing with shortened sides and holes drilled for the various tubes, pipes and posts that extend therefrom. This cover can be attached, for example, cemented, directly to the lid of the standard-sized battery.

The remainder of the charge-retention battery, with the exception of the transfer tubes and the gas inlet/outlet tubes, is assembled with standard-sized parts that have been slightly modified to accommodate these tubes. Also, the battery posts and electrolyte fill tubes that extend from a conventional battery must be lengthened, so that they emerge from the attached cover. The cost of manufacture of this charge-retention battery, with its somewhat modified standard parts, is lower than the cost of manufacture of known prior charge-retention batteries that require customized parts.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
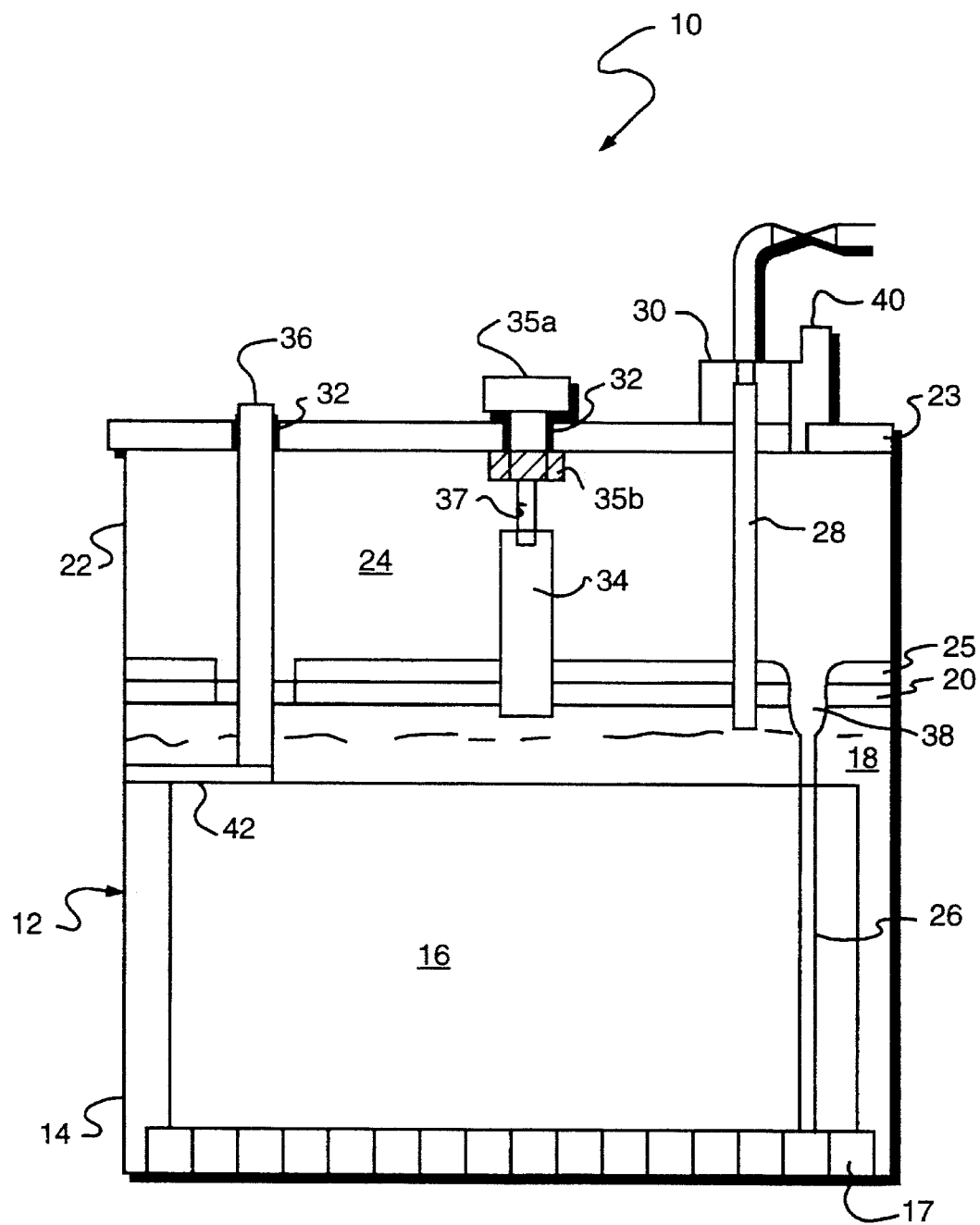
FIG. 1 is a front view of a multiple cell battery, illustrating one cell of the battery.

FIG. 1 depicts a front view of one cell 12 of a charge-retention battery 10. The battery 10 typically includes at least six of these cells. The cells are enclosed in a standard-size battery case 14, which includes interior walls (not shown) that separate the cells. To reveal the interior of the cell 12, the front of the battery case 14 has been cut away. The cell 12 includes a plurality of battery plates 16, only one of which is visible in this drawing. When the battery 10 is in use, the battery plates 16 are immersed in electrolyte 18, as depicted in the drawing. Reference number 19 denotes the height of the electrolyte 18 in the cell.

A case lid 20 supports a hollowed, partitioned cover 22, which includes for each cell an electrolyte reservoir 24.

When the battery 10 is not in use, the electrolyte 18 is removed from the cell 12 to the reservoir 24, to prevent self-discharge of the battery.

The cell 12 and the associated reservoir 24 are connected by a straight, minimum-length transfer tube 26. To remove the electrolyte 18 from the cell 12 an inert gas is fed, under pressure, into the cell 12 from a manifold 30 through a gas inlet/exhaust tube 28. The pressurized gas, as it fills the cell 12, forces the electrolyte 18 through the transfer tube 26 to the associated reservoir 24. The gas then remains in the cell to protect the battery plates from deterioration.

To return the battery 10 to service, the inert gas is released from the cell 12 through the gas inlet/exhaust tube 28. As the pressure inside the cell decreases with the release of the gas, the electrolyte 18 returns, under the force of gravity, through the transfer tube 26 to the cell 12.

The cover 22, which includes the reservoirs 24, has the same lateral dimensions as the battery case 14, however, its height is substantially less, e.g., four inches. The cover 22 can thus be readily manufactured by cutting down a standard battery case. The cover 22, like the lid 20, must be modified by including therein holes 32 and 38 for the various tubes, pipes and posts. In addition, the top 23 of the cover 22 includes a vent 40 through which unwanted gases produced in either the reservoir 24 or in the cell 12 may be released.

The various holes 32 and 38 in the lid 20 and the top and bottom 23 and 25 of the cover 22 are sized to receive the associated tubes, pipes and posts and, also, epoxy sealant, lead puddling, or other sealing material. The tube 28, for example, must be secured to the top, bottom and lid during assembly, to ensure that pressurized gas does not leak from the battery.

Since the battery posts 36 must be extended beyond their standard lengths, extra sections are preferably "burned on" to standard-size posts during assembly. Alternatively, the posts may be originally manufactured to the desired length. If lead puddling is used to seal the holes 32 around the battery posts 36, the posts are preferably scored where they meet the lid 20.

The electrolyte fill pipe 34 may be extended through the reservoir by burning on an extra length, and then further extended through the top 23 by a funnel-shaped tube 37, which is inserted into the pipe 34. For ease of assembly, this funnel-shaped tube 37 may be fed into the pipe 34 after the cover 22 is in place. To prevent leakage, one end 37a of the tube 37 is sealed to the pipe 34 by, for example, an O-ring 39 and the other end 37b is sealed to the top 23 with epoxy or another sealant. A conventional cap 35 allows access to the tube 37 from the outside of the battery 10.

The cover 22 may be manufactured from a standard battery case, by shortening the sides to approximately 4 inches long. Interior walls for the cells are included in the case and must be shortened, also. These interior walls become the partitions for the associated reservoirs. The cover 22 can be thus be rather inexpensively manufactured.

As discussed above, the cover 22 includes a separate reservoir for each cell. When the battery is not in use, the electrolyte from a cell is transferred to an associated reservoir through the transfer tube 26. Thereafter, this electrolyte is transferred back through the tube to the cell, to place the battery in service. Thus, the cell receives a usable amount of electrolyte. This is in contrast to a battery with a communal reservoir, which may return unequal amounts of electrolyte to the various cells, and thereby, adversely affect battery performance. The partitioned reservoirs also ensure that the positive and negative battery posts 36, which extend through two of these reservoirs, will not electrically short via the stored electrolyte. A communal reservoir does not protect against shorting.

Figure 2:
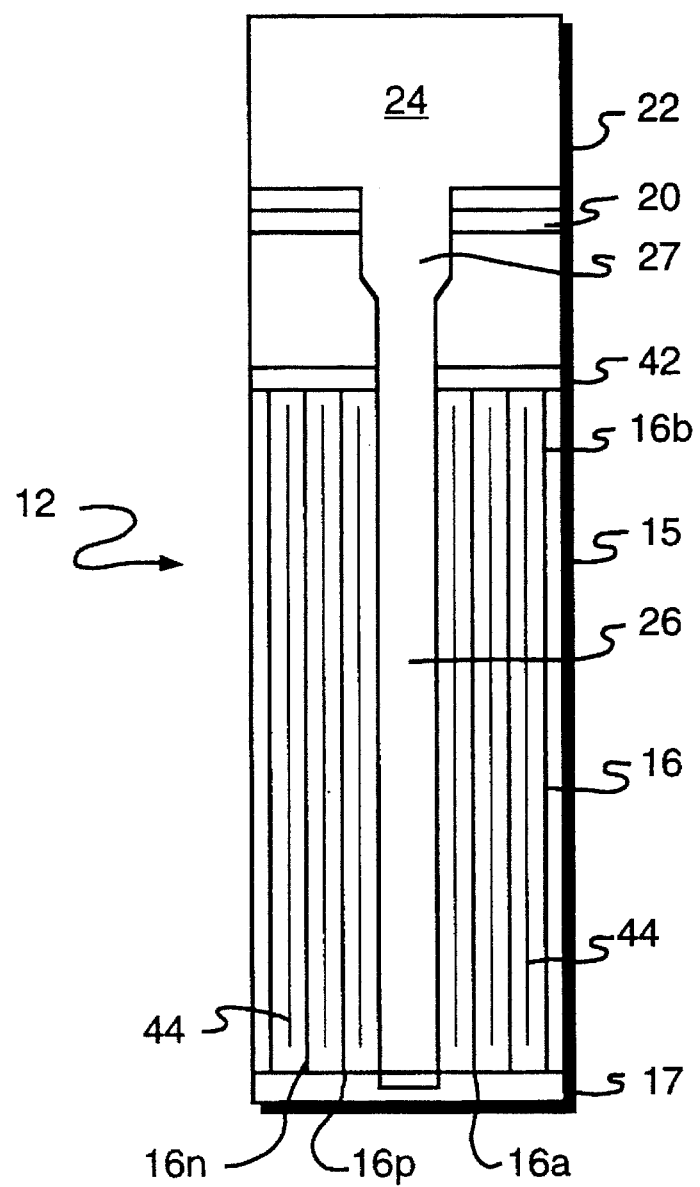
FIG. 2 is a side view of a cell depicted in FIG. 1.

Referring now to FIG. 2, a cell 12, which is depicted in cross-sectional side view, includes side walls 15 that separate this cell from adjacent cells (not shown). The cell includes alternating positive battery plates 16p and negative battery plates 16n. The bottom ends 16a of each of these plates rest on a plate support 17. The top ends 16b of the positive plates 16p connect to a positive post strap 42 that extends along one side of the cell. The top ends 16a of the negative plates 16n connect to negative post strap 46 (FIG. 3) that extends along the opposite side of the cell. The negative post strap 46 is cut away in FIG. 2, to reveal the interior of the cell. Permeable separators 44, which electrically isolate adjacent plates 16n and 16p, extend from the plate support 17 and run between the plates.

Figure 3:
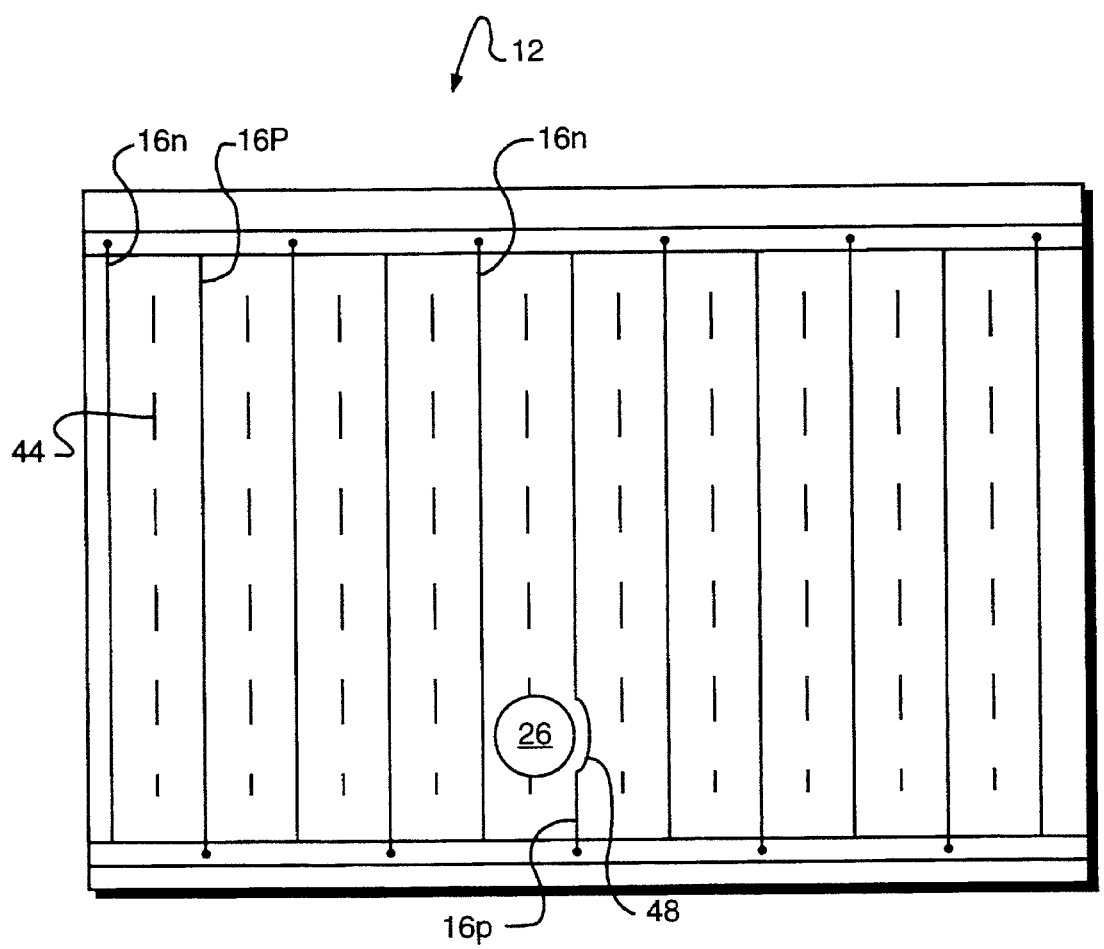
FIG. 3 is a top view of the cell depicted in FIGS. 1 and 2.

Referring also to FIG. 3, the transfer tube 26 extends between two of the battery plates 16p and 16n close to the positive post strap 42. These plates and the separator 44 that extends between them are modified, to accommodate the tube.

The one plate 16n on one side of the transfer tube is shortened and the plate 16p on the other side of the tube is essentially split into two sections 48 and 50. Section 48 of the plate 16p remains attached to the positive post strap 42. A jumper lead 52 electrically connects this section 48 to the other section 50, so that the two sections of the plate can function together as a positive electrode. Without this jumper lead 52, only the smaller section 48 of the plate 16p would operate as a positive electrode. With the jumper, the tube 26 is included in the cell with a minimum loss of operational battery plate surface area. A jumper is not required for the shortened negative plate 16n, since the relatively large portion of the plate that remains in the cell is connected to the negative post strap 46, and thus, functions as a negative electrode. Alternatively, the transfer tube may be located close to the negative post strap, and the jumper 52 used instead to connect sections of the negative plate 16n.

The plates in a standard battery are separated by—inches. The tube in the preferred embodiment is oval in shape, and essentially fits between the two adjacent battery plates 16p and 16n in the middle of the cell. In a cell which includes a battery post 36, the transfer tube 26 is positioned at the end of the cell that is opposite the post.

The transfer tube 26 in the preferred embodiment preferably includes a wider, round neck 27 at the end that connects to the reservoir. This facilitates the sealing of the tube to the lid 20 and the bottom 25 of the cover 22.

The size of the tube 26 affects the transfer rate of the electrolyte. The size must, however, be balanced against the loss of surface area of the battery plates 16. In the preferred embodiment, the tube 26 extends across two plates 16p and 16n and an intervening separator 44. These plates and the separator must thus each be shortened by approximately 1.5 inches. This results in a loss of surface area per cell of approximately 6% in a conventional battery having eleven plates per cell. The transfer tube 26 can be made wider or narrower, as desired, with a corresponding decrease or increase in total surface plate area per cell.

The charge-retention battery is not much more complex or expensive to manufacture then a conventional battery. First, the battery plates 16n and 16p and intermediate separator 17 are modified, as necessary, to accommodate the transfer tubes 26. Then the plates and separators are positioned within the battery case 14. The plates are attached to the appropriate positive or negative post straps and the battery posts are attached to these straps in a conventional manner. The battery posts may be manufactured to the desired, extended length or a conventional size, and sections burned on to extend their lengths.

Holes 32 for the transfer tube 26 and the gas inlet/outlet tube are drilled in the lid 20, along with the holes 38 for the battery posts and electrolyte fill tube 34. Corresponding holes 32 and 38 are drilled in a cover 22 which is formed by cutting down the height of a conventional battery case. This cover 22 is then cemented to the lid 20, such that the holes 32 and 38 align, and the cover and the lid are positioned atop the case 14, such that the battery posts extend therefrom. Sealant is applied around the posts to seal them to the lid and the cover.

The electrolyte fill tube 34, gas inlet/outlet tube 28 and transfer tube 26 are then inserted into the appropriate holes in the cover. Epoxy sealant or cold sealant is applied to seal these tubes to one or both of the lid 20 and the bottom 25 of the cover 22, as appropriate.

Next, holes 32 and 38 are drilled in the top 23 of the cover 22 and this top is positioned on the cover such that the battery posts and the gas inlet/outlet tubes extend therefrom. The funnel-shaped tube 37 is then inserted into the end of the electrolyte fill tube to extend the tube through the top of the cover. This tube is sealed to the top in a conventional manner. To complete the assembly, the manifold 30 is attached to the extended portions of the gas inlet/outlet tubes 28.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A charge-retention battery including:
    A. a battery case separated into a plurality of battery cells, the battery case including a bottom, a lid and four side walls;
    B. within each cell, a plurality of alternating positive and negative battery plates;
    C. a cover that fits on top of the battery case lid, the cover including a plurality of reservoirs, each associated with a battery cell;
    D. a plurality of transfer tubes, each one extending from a reservoir, through the lid of the battery case into the associated cell and between adjacent battery plates; and
    E. means for applying to each cell inert gas under pressure, the gas forcing electrolyte from the cell through the transfer tube and into the associated reservoir, said means releasing the gas to allow the return of the electrolyte through the transfer tube to the cell.

2. The battery of claim 1 further including battery posts that are lengthened to extend through the cover.

3. The battery of claim 1 further including corresponding holes in the lid and the cover for an electrolyte fill tube.

4. The battery of claim 1 further including in each cell a plurality permeable separators between adjacent plates, the plates and separators proximate to the transfer tube being cut to accommodate the tube.

5. The battery of claim 4, wherein the transfer tube fits into the cell such that one positive plate, one negative plate and one separator are cut, the negative plate and the separator being shortened and the positive plate being cut into two sections.

6. The battery of claim 5 further including a jumper line that extends between the two sections of the positive plate and around the transfer tube, the jumper line electrically connecting the sections.

7. The battery of claim 4, wherein the transfer tube fits between adjacent plates, such that two plates and a separator between the plates are modified to accommodate the tube.

8. The battery of claim 1, wherein the cover consists of a battery case with shortened sides.

9. A charge-retention battery including:
    A. a battery case separated into a plurality of battery cells, the battery case including a bottom, a lid and four side walls;
    B. a cover that fits on top of the battery case lid, the cover including a plurality of reservoirs each associated with a battery cell and consisting of a second battery case with shortened side walls;
    D. a plurality of transfer tubes, each one extending from a reservoir in the cover, through the lid of the battery case and into the associated cell; and
    E. means for applying to each cell inert gas under pressure, the gas forcing electrolyte in the cell through the transfer tube and into the associated reservoir, said means releasing the gas to allow the return of the electrolyte through the transfer tube to the cell.

10. The battery of claim 9 further including for each cell a transfer tube that extends between a reservoir in the cover, through the lid and into the associated cell.

\* \* \* \* \*